United States Patent [19]

Healy

[11] Patent Number: 4,763,864

[45] Date of Patent: Aug. 16, 1988

[54] FLOATING COLUMN SUPPORT PEDESTAL

[75] Inventor: John T. Healy, Irvine, Calif.

[73] Assignee: O'Connor Engineering Laboratories, Costa Mesa, Calif.

[21] Appl. No.: 109,837

[22] Filed: Oct. 13, 1987

[51] Int. Cl.⁴ .............................................. A47G 29/00
[52] U.S. Cl. ................ 248/123.1; 248/162.1; 248/297.1; 248/574
[58] Field of Search ............... 248/123.1, 162.1, 297.1, 248/574, 631, 634, 638; 354/292, 293

[56] References Cited

U.S. PATENT DOCUMENTS

| | | | |
|---|---|---|---|
| 3,788,587 | 1/1974 | Stemmler | 248/631 X |
| 3,989,211 | 11/1976 | Gundlach | 248/162.1 |
| 4,156,391 | 5/1979 | Ubezio | 248/162.1 X |
| 4,158,490 | 6/1979 | Gottschalk et al. | 248/123.1 X |
| 4,523,732 | 6/1985 | Biber et al. | 248/123.1 |
| 4,660,798 | 4/1987 | Kinoshita | 248/123.1 X |
| 4,682,753 | 7/1987 | Clark | 248/631 X |
| 4,697,773 | 10/1987 | Jaumann et al. | 248/123.1 X |

Primary Examiner—Ramon O. Ramirez
Attorney, Agent, or Firm—Leydig, Voit & Mayer

[57] ABSTRACT

An instrument support pedestal having a post pneumatically urged upwardly to counterbalance an instrument on the post, with the post slidably mounted in an elongated extrusion having vessels connected to the post pneumatics to form a large accumulator and another vessel serving as a high pressure reservoir so that the pneumatic force on the post can be varied.

5 Claims, 5 Drawing Sheets

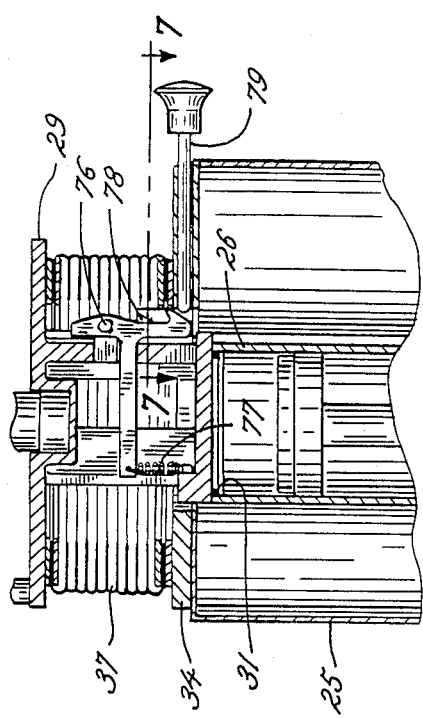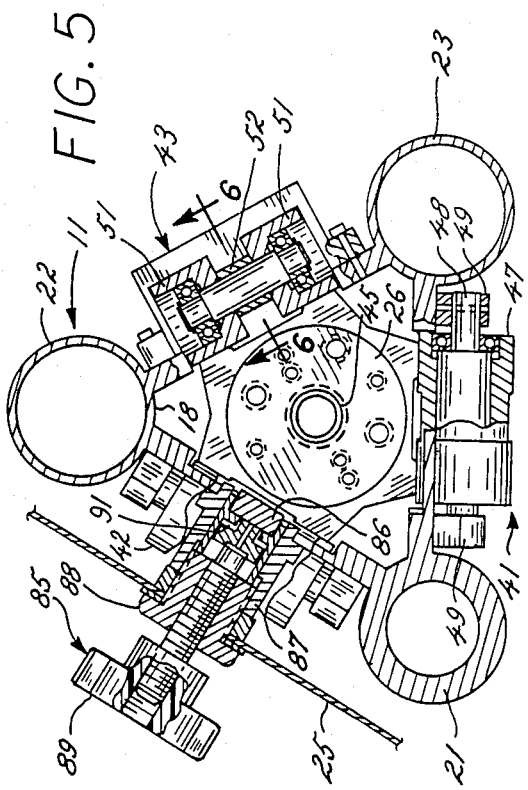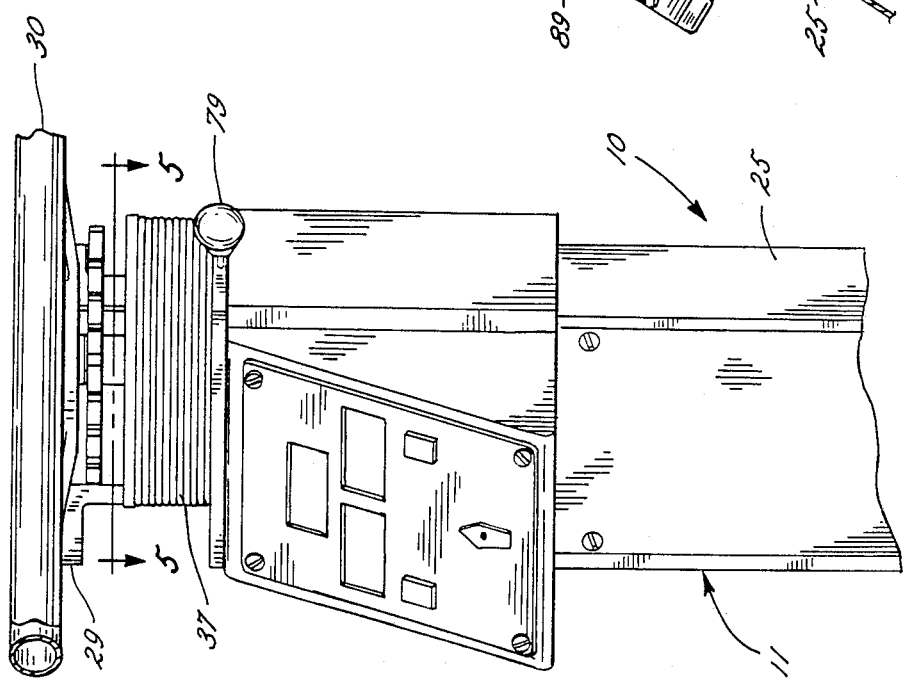

FLOATING COLUMN SUPPORT PEDESTAL

BACKGROUND

This invention generally relates to instrument, such as camera, supporting dollies and more particularly concerns a floating pedestal for such dollies.

The heavy film cameras of movie studios were conventionally mounted on dollies having wheels for horizontal movement and variable length pedestals or columns supporting the camera for limited vertical movement. It was not uncommon to counterbalance the vertically movable portions of the column so as to cause the camera to have virtually zero weight, thereby creating a floating condition permitting the camera to be easily positioned vertically within the range of column extension movement.

Devices of this kind require adjustability in counterbalancing force since the supported camera weight will vary depending upon the lens chosen or other equipment mounted on the camera.

Modern cameras, particularly video cameras, have become substantially lighter than the former studio film cameras, and it has also become increasingly desirable to film (or tape) "on location" and outside of a studio. With a basically lighter camera, a variation in lens or other accessories creates a wide range of weight that must be counterbalancing to achieve the full floating effect.

Accordingly, it is an object of the invention to provide a full floating instrument support that is compact, light in weight, and fully portable, hence well suited for out-of-studio work with lighter modern camera equipment.

It is a related object to provide such a support which can be easily and rapidly adjusted to counterbalance a wide range of camera weights to achieve the floating condition. Another object is to provide a support of this kind which, once adjusted for camera weight, holds that counterbalancing effect through the full vertical range of column height adjustment. A collateral object is to provide a support of the foregoing kind that offers a solid support which nevertheless operates smoothly to vertically position the camera.

It is also an object to provide a support as characterized above that is completely self-contained and, while using pneumatic force, requires no pump or air tank once it has been charged for a day's use.

A further object is to provide a support of the above character which is economical to manufacture, particuarly as compared with the conventional studio dollies having similar characteristics for in-studio use.

SUMMARY

The floating pedestal is a support column mounted on a castor wheeled dolly. The column is defined by a post mounted for vertical movement in an elongated housing with the post being fitted over a rod and a ported piston. The ends of the post are sealed to form two air chambers on either side of the ported piston and air pressure in these chambers will, because of the rod cross sectional area, exert a net upward force to counterbalance a load on the post. The housing is an extrusion defining three tubular air reservoirs. Two reservoirs are used as an accumulator and are in open connection with the chambers. The third reservoir is a high pressure air storage reservoir. A valve permits adjustment of the air pressure in the chambers to counterbalance various loadings placed on the post.

DRAWINGS

Other objects and advantages of the invention will become apparent upon reading the following detailed description and upon reference to the drawings, in which:

FIG. 3 is a fragmentary elevation taken approximately along the line 3—3 in FIG. 1;

FIG. 4 is a fragmentary section taken approximately along the line 4—4 in FIG. 1;

FIG. 5 is a section taken along the line 5—5 in FIG. 3;

DESCRIPTION

Figure 1:
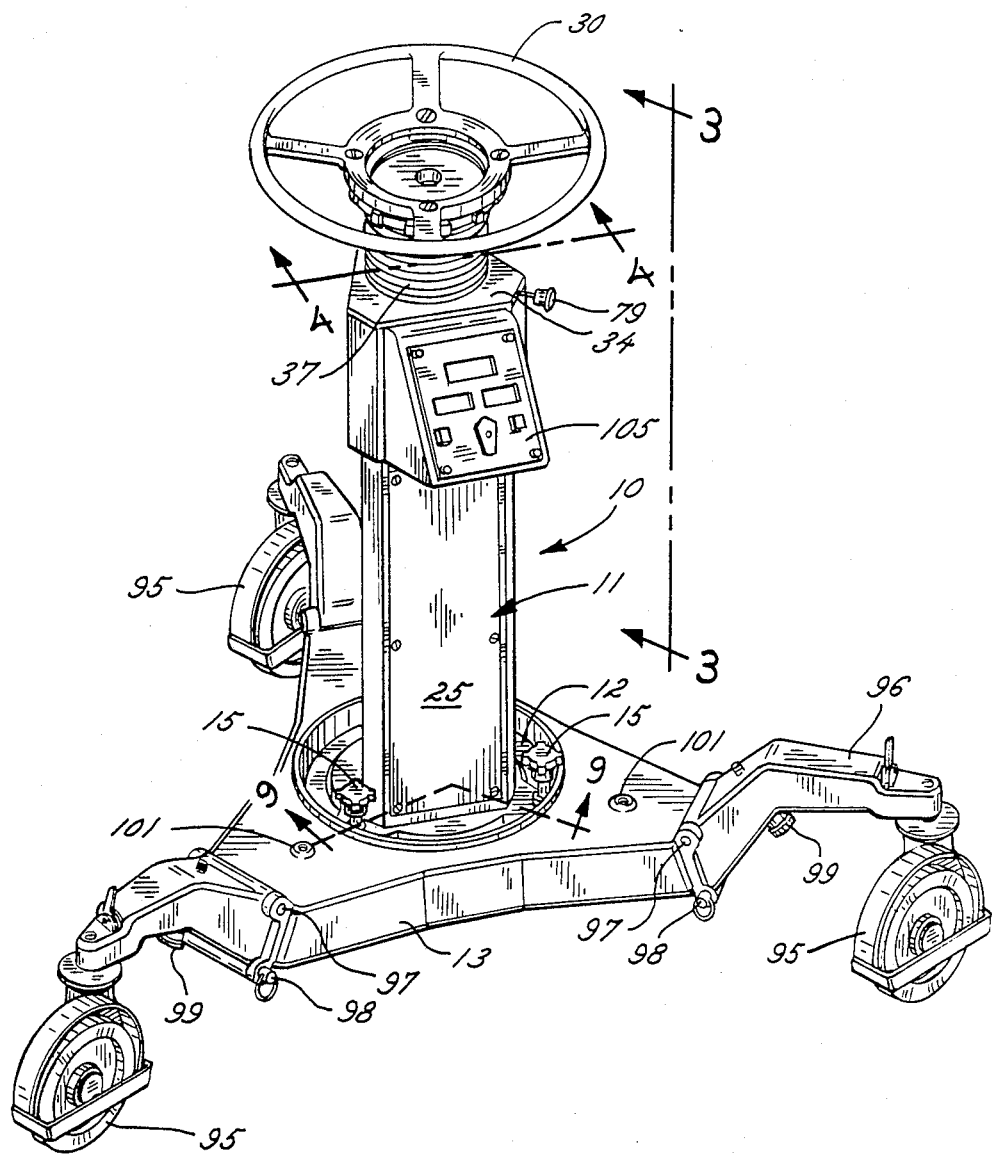
FIG. 1 is a perspective of a pedestal assembly embodying the invention.
Figure 2:
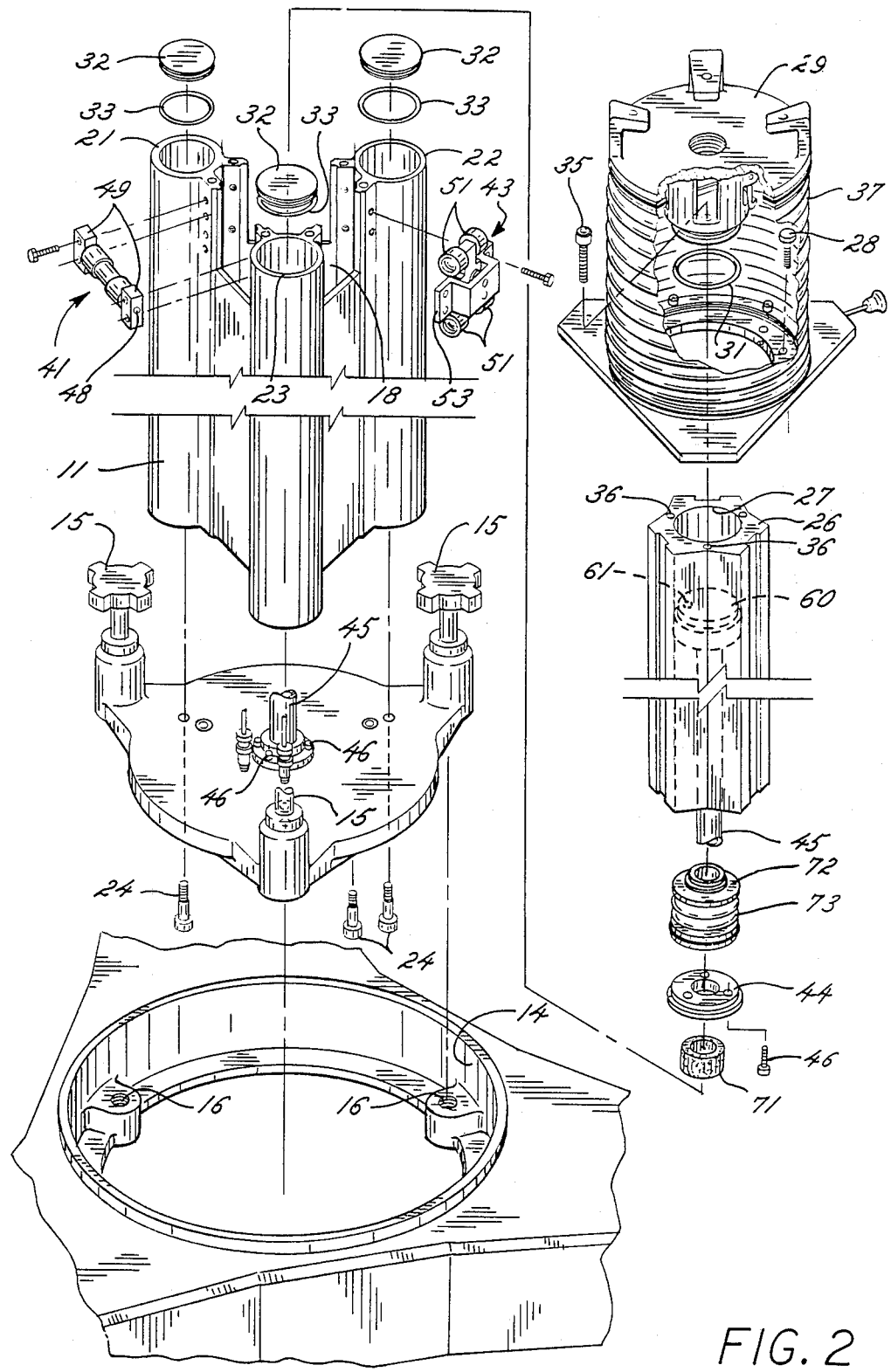
FIG. 2 is an exploded fragmentary perspective of the operating elements of the pedestal shown in FIG. 1 which are located within a decorative shroud.
Figure 8:
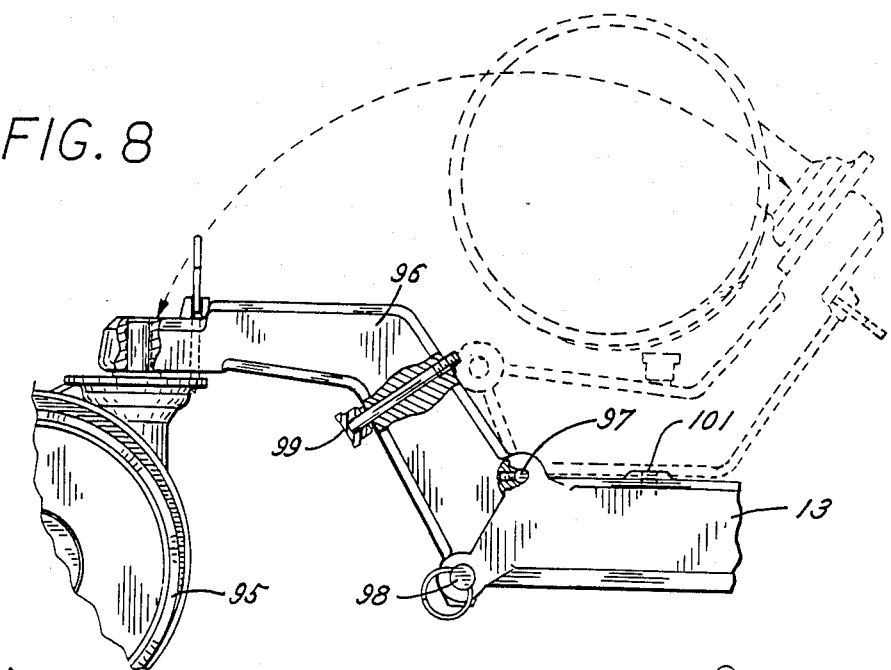
FIG. 8 is a fragmentary elevation of one of the dolly arms of the pedestal shown in FIG. 1.
Figure 7:
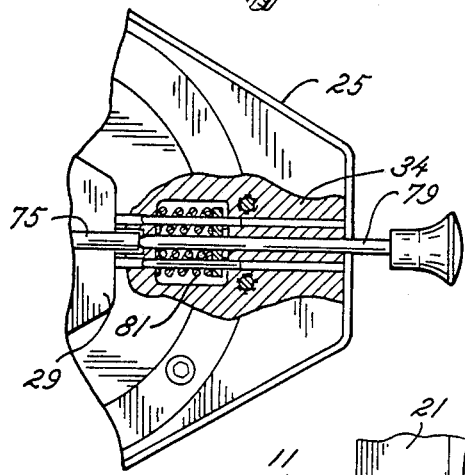
FIG. 7 is a fragmentary section taken approximately along the line 7—7 in FIG. 4.
Figure 6:
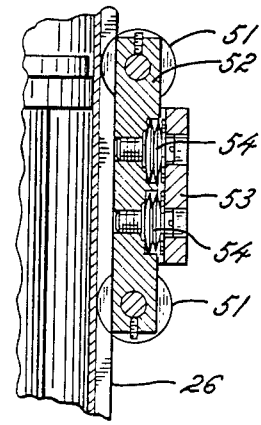
FIG. 6 is a fragmentary section taken approximately along the line 6—6 in FIG. 5.
Figure 9:
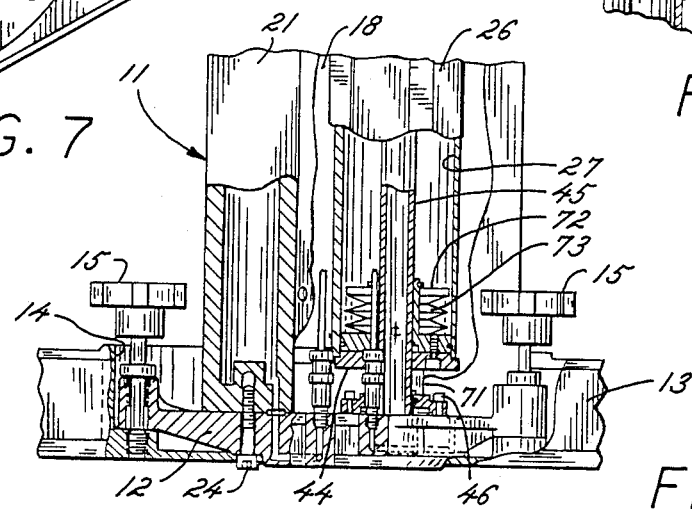
FIG. 9 is a fragmentary section taken approximately along the line 9—9 in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown an instrument support column 10 comprising a vertical elongated housing 11 mounted on a base 12 that, in the illustrated embodiment, is fitted into a three-armed dolly 13. The base 12 fits into an annular recess 14 in the dolly 13 and is releasably secured by tiedown screws 15 which engage threaded holes 16 in the dolly. This arrangement permits solid interconnection between the housing 11 and the dolly 13, together with easy disassembly through manipulating the accessible screws 15 for alternate mounting of the housing.

The housing 11 is an elongated extrusion having a roughly triangular central cavity 18 with three cylindrical tubular portions 21, 22 and 23 positioned on the corners of the triangle. The extrusion 11 is fixed to the base 12, sealing the lower ends of the tubular portions 21–23, by a plurality of screws 24. For styling and appearance sake, a sheet metal shroud 25 is formed around and secured to the housing extrusion 11.

To hold a camera on the support column 10, an elongated post 26 is slidably mounted in the housing cavity 18 for vertical movement. The post 26 has an open cylindrical center 27 whose top end is fixed, by screws 28, to a casting 29 to which a circular handle-wheel 30 is secured. An O-ring 31 between the casting 29 and the upper end of the post 26 seals the top end of the post center 27. The upper ends of the housing tubular portions 21–23 are sealed by caps 32 and seal elements 23.

A plate 34 is fixed to the top of the housing extrusion 11, by screws 35 fitted in holes 36, and forms the top of the shroud 25. A flexible bellows 37 is preferably fitted between the plate 34 and the casting 29 so as to enclose the top of the housing cavity 18.

The post 26 is closely controlled for wobble-free sliding movement by a plurality of roller sets 41, 42 and 43 at the top of the housing extrusion 11, while the lower end of the post is fitted with a cap 44 that slides on a rod 45 that is fixed by screws 46 to the base 12. Two of the roller sets 41 and 42 comprise rollers 47 journaled on shafts 48 fixed in blocks 49 secured to the housing extrusion 11. One roller set 43 consists of four rollers 51 journaled on the ends of a block 52 that is pinned in a bracket 53 that is secured to the housing extrusion 11. Bevel springs 54 between the bracket 53 and the block 52 strongly bias the rollers 51 against the post 26, which in turn strongly forces the post against the other two roller sets 41 and 42. If desired, viscous drag fluid can be inserted between the shafts 48 and the surrounding rollers 47 so as to impose the sort of fluid drag on movement of the post as is found in fluid camera panheads.

Figure 10:
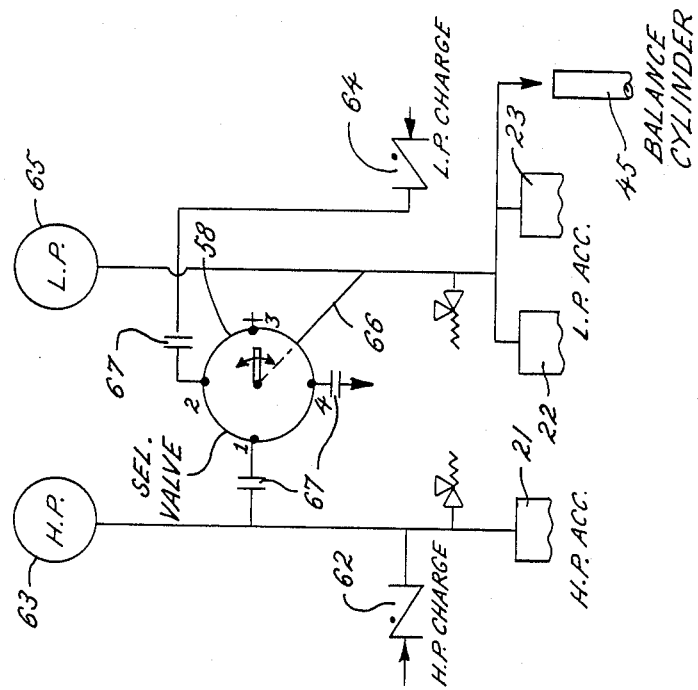
FIG. 10 is a schematic of the pneumatic system for the pedestal shown in FIG. 1.
Figure 11:
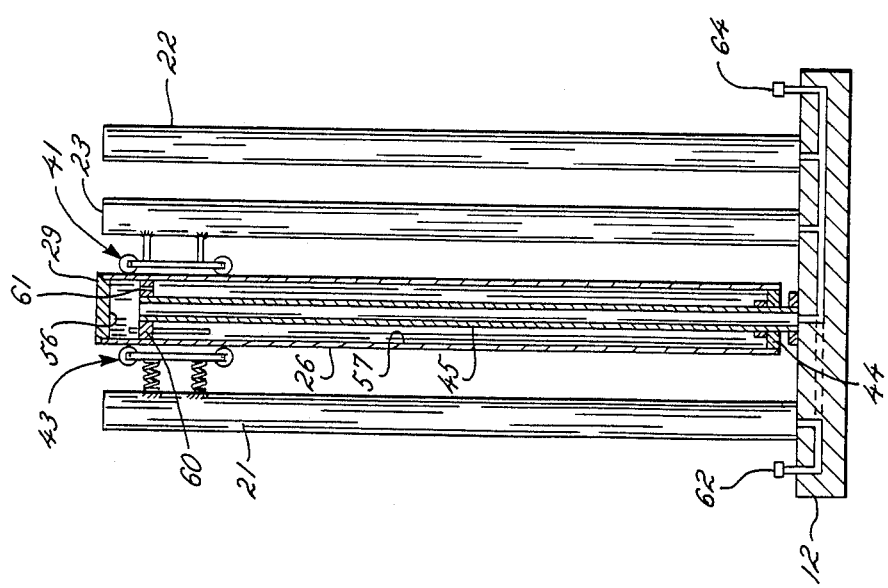
FIG. 11 is a diagrammatic showing of the counterbalancing structure otherwise appearing in FIG. 2.

In accordance with the invention, there are two interconnected pneumatic chambers, chamber 56 having an effective surface urging the post 26 up and chamber 57 having an effective surface urging the post down with the effective surface of the chamber 56 being larger, a pressure reservoir vessel consisting of the interior of the tubular portions 22, 23 connected to the chambers 56, 57 to serve as an accumulator, and a high pressure vessel consisting of the interior of the tubular portion 21 to supply air to the chambers, all under the control of a valve 58 which permits the pneumatic balancing of a load on the post 26. This arrangement can be best seen in schematic drawings of FIGS. 10 and 11. Since the tubular portion 21 will serve as a high pressure vessel, preferably its wall thickness is somewhat greater than the wall thickness of the tubular portions 22, 23. The rod 45 is hollow, which serves as the air passage from the base 12 to the chambers 56, 57, and appropriate passages formed in the base 12 connect the several vessels and chambers to the valve 58.

The chambers 56, 57 are separated by a piston 60 fixed on the upper end of the rod 45, and a passage hole 61 through the piston 60 pneumatically interconnects the chambers so that the air pressure in both the chambers remains the same. The effective surface in the chamber 56 urging the post 26 up is the lower surface of the casting 29, and the effective surface in the chamber 57 urging the post down is the top of the cap 44. The area of these surfaces differs by the cross-sectional area of the rod 44. The air pressure in the chambers times that cross-sectional area therefore is a force that can counterbalance the instrument supported on the post 26.

The high pressure reservoir vessel defined by the tubular portion 21 is charged through a one-way valve 62 and, preferably, an air pressure gauge 63 is connected to display that pressure. If desired, the portions 22, 23 and the chambers 56, 57 can be initially charged through a second one-way valve 64, and this air pressure can be monitored by a second pressure gauge 65. The valve 58 connects the portions 22, 23 and the chambers 56, 57 through a line 66 to any one of four settings. In setting No. 3 in FIG. 10, the line 66 is blocked and the pressure measured by the gauge 65 is maintained. In setting No. 2, the line 66 is connected to the one-way valve 64 for initial charging. In setting No. 4, the line 66 is vented to the atmosphere. And in setting No. 1, the line is connected to the high pressure reservoir in the tubular portion 22 to build up the counterbalancing air pressure. Air flow through the valve 58 is dampened by restrictive orifices 67 controlling valve settings 1, 2 and 4.

It will be apparent that the counterbalancing air pressure indicated by the gauge 65 can be increased by moving the valve 58 to the No. 1 setting, or decreased by moving the valve to the No. 4 position. Once the proper pressure is reached, moving the valve 58 to the No. 3 setting maintains that pressure.

Upward movement of the post 26 changes the total volume of the chambers 56, 57 by the volume of that portion of the rod 45 which is no longer in the chamber 57 as the post moves up. However, because the chambers 56, 57 are in open communication with both of the larger vessels formed by the tubular portions 22, 23, the total volume of air at the pressure of the gauge 65 is little changed by the vertical movement of the post 26. This means that the portions 22, 23 act as an accumulator, keeping the air pressure substantially constant, and thus the counterbalancing force stays substantially constant through the full range of vertical movement of the post. Once the proper air pressure is obtained to counterbalance whatever instrument is supported on the post 26, the vertical position of the instrument can be varied by the operator manipulating the handle 30 and the instrument will float on the post 26 as if weightless.

For cushioning the arrival of the post 26 at the limit positions of its vertical movement, a resilient block 71 is fitted around the bottom of the rod 45 so as to engage the cap 44 when the post is at its lowermost position. A plate 72 backed by Bellville springs 73 is fitted on the rod 45 above the cap 44 so that the plate 72 will resiliently engage the piston 60 when the post is at its highest position.

To lock the post 26 in its down, collapsed position, and thus facilitate manual movement of the entire column 10, a latch 75 is pivoted at 76 on the casting 29 and biased by spring 77 so as to hook under a lug 78 on the plate 34. A plunger 79 is slidably fitted in the plate 34 and biased outwardly by a spring 81. In operation, movement of the post 26 to its lowermost collapsed position causes the latch 75 to snap over the lug 78 so that the hook of the latch will prevent upward movement of the post. When it is desired to release the latch, the plunger 79 is simply pushed inwardly which pivots the latch and swings the hook free of the lug 78 and the post 26 can then be lifted.

To lock the post 26 in an adjusted position other than fully collapsed, a brake device 85 selectively presses a brake pad 86 against one side of the post 26. The pad 86 is mounted in a collar 87 fixed in one wall of the housing 11. The collar supports a threaded nut 88 into which a finger screw 89 is turned. A spring 91 normally holds the pad spaced from the post. If the brake is to be applied, the finger screw 89 is rotated, thereby driving the pad 86 firmly against the post. Reverse rotation of the screw 89 releases the brake.

The illustrated dolly 13 has foldable arms carrying castor wheels 95 on outer pivoted portions 96. The portions 96 pivot on shafts 97 and are held in rigid extended position by removable pins 98. Finger screws 99 are mounted in the portions 96 to register with threaded holes 101 in the dolly 13 when the arms are folded. Therefore, to collapse the dolly, the pins 98 are removed, the portions 96 swung upward about their pivot shafts 97, and the portions 96 are locked in their folded position by threading the finger screws 99 into the holes 101.

In the illustrated assembly, the gauges 63, 65, the valve 58 and operating controls for the valve are mounted in a control panel housing 105 positioned at the top of the extruded housing 11 and blending in with the other elements forming the shroud 25.

To give some general idea of size and proportion of a workable instrument support column embodying the invention, a unit suitable for supporting cameras up through the 100 pound range uses an elongated housing 11 that is 28" long and a post 26 having a 22" stroke or range of adjustment. The post center portion 27 in this embodiment has a 2¼" diameter and the tubular portions 21–23 of the elongated housing are about 1¾" in internal diameter, that portion forming the high pressure reservoir being slightly less because of its thicker wall diameter and the other portions being slightly more than that dimension.

I claim as my invention:

1. An instrument support column comprising, in combination, a base, a vertical elongated housing mounted on said base, an elongated post slidably mounted in said housing for vertical movement, means defining a pair of interconnected pneumatic chambers, one having an effective surface urging said post up and the second having an effective surface urging said post down, said one chamber's effective surface being larger than said second chamber's effective surface, a reservoir vessel on said base pneumatically connected to said chambers, a high pressure vessel on said base, and valve means for selectively directing air from said high pressure vessel to said chambers and selectively venting air from said chambers so that said chambers can balance a given load on said post.

2. The combination of claim 1 in which said chambers are defined by said post and are separated by a ported piston secured to a rod fixed to said base.

3. The combination of claim 1 in which said vessels are defined by elongated portions of said housing spaced around the slidable mounting for said post.

4. The combination of claim 3 in which said housing is an elongated extrusion having a central cavity for receiving said post, a tubular portion defining said high pressure vessel, and a plurality of tubular portions defining said reservoir vessel.

5. The combination of claim 1 in which said post has flattened peripheral surfaces, and a plurality of rollers mounted on said housing and biased against said flattened post surfaces so as to hold the post against rotation and guide its vertical movement without lateral wobble.

* * * * *